(12) United States Patent
Mukkavilli et al.

(10) Patent No.: US 8,489,124 B2
(45) Date of Patent: Jul. 16, 2013

(54) METHODS AND APPARATUS FOR POSITION LOCATION IN A WIRELESS NETWORK

(75) Inventors: Krishna Kiran Mukkavilli, San Diego, CA (US); Fuyun Ling, San Diego, CA (US); Gordon Kent Walker, Poway, CA (US); Murali Ramaswamy Chari, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 279 days.

(21) Appl. No.: 12/338,901

(22) Filed: Dec. 18, 2008

(65) Prior Publication Data
US 2009/0117917 A1  May 7, 2009

Related U.S. Application Data

(62) Division of application No. 11/517,119, filed on Sep. 6, 2006, now Pat. No. 7,706,328.

(60) Provisional application No. 60/756,101, filed on Jan. 4, 2006.

(51) Int. Cl.
*H04W 24/00* (2009.01)
*H04W 4/00* (2009.01)

(52) U.S. Cl.
USPC .......... 455/456.6; 455/456.5; 455/456.1; 370/332; 370/338

(58) Field of Classification Search
USPC ................ 455/456.6; 370/332, 338
See application file for complete search history.

(56) References Cited

U.S. PATENT DOCUMENTS

| | | | |
|---|---|---|---|
| 4,252,995 A | 2/1981 | Schmidt et al. | |
| 4,481,658 A | 11/1984 | Schmidt | |
| 4,493,099 A | 1/1985 | Schmidt | |

(Continued)

FOREIGN PATENT DOCUMENTS

| | | |
|---|---|---|
| CN | 1691654 A | 11/2005 |
| EP | 1072900 | 1/2001 |

(Continued)

OTHER PUBLICATIONS

Written Opinion- PCT/US07/060123, International Search Authority—European Patent Office—Oct. 31, 2007.

(Continued)

*Primary Examiner* — Kamran Afshar
*Assistant Examiner* — Omoniyi Obayanju
(74) *Attorney, Agent, or Firm* — Seyfarth Shaw LLP

(57) ABSTRACT

Methods and apparatus for position location in a wireless network. In an aspect, a method is provided that includes determining whether a symbol to be transmitted is an active symbol, wherein the symbol comprises a plurality of subcarriers, and encoding identification information on a first portion of subcarriers if it is determined that the symbol is the active symbol. The method also includes encoding idle information on a second portion of subcarriers if it is determined that the symbol in not the active symbol. In an aspect, an apparatus includes detector logic configured to decode a plurality of symbols to determine identification information that identifies a plurality of transmitters, and to determine a plurality of channel estimate associated with the plurality of transmitters. The apparatus also includes position determination logic configured to calculate a device position based on the plurality of transmitters and the plurality of channel estimates.

34 Claims, 7 Drawing Sheets

U.S. PATENT DOCUMENTS

| | | |
|---|---|---|
| 5,889,474 A | 3/1999 | LaDue |
| 6,134,267 A | 10/2000 | Schafer et al. |
| 6,208,871 B1 * | 3/2001 | Hall et al. ............... 455/517 |
| 6,246,725 B1 | 6/2001 | Vanzieleghem et al. |
| 6,256,498 B1 | 7/2001 | Ludwig |
| 6,456,653 B1 | 9/2002 | Sayeed |
| 6,804,223 B2 | 10/2004 | Hoffmann et al. |
| 7,248,559 B2 | 7/2007 | Ma et al. |
| 7,248,880 B2 | 7/2007 | Gheorghiu et al. |
| 7,292,189 B2 | 11/2007 | Orr et al. |
| 7,359,312 B2 | 4/2008 | Riazi et al. |
| 7,411,896 B1 * | 8/2008 | Karsi ........................ 370/208 |
| 7,433,390 B2 | 10/2008 | Hepler et al. |
| 7,586,836 B2 | 9/2009 | Park et al. |
| 7,639,660 B2 | 12/2009 | Kim et al. |
| 7,701,388 B2 | 4/2010 | Shyr et al. |
| 7,706,328 B2 | 4/2010 | Mukkavilli et al. |
| 8,165,064 B2 | 4/2012 | Mukkavilli et al. |
| 2003/0072395 A1 | 4/2003 | Jia et al. |
| 2003/0076777 A1 | 4/2003 | Stuber et al. |
| 2003/0162547 A1 | 8/2003 | McNair |
| 2006/0133388 A1 | 6/2006 | Wang et al. |
| 2006/0256708 A1 | 11/2006 | Wang et al. |
| 2006/0268841 A1 | 11/2006 | Nagaraj et al. |
| 2006/0291577 A1 | 12/2006 | Boariu |
| 2007/0013584 A1 | 1/2007 | Camp |
| 2007/0036065 A1 | 2/2007 | Wang |
| 2007/0036066 A1 | 2/2007 | Thomas et al. |
| 2007/0066313 A1 | 3/2007 | Collins et al. |
| 2007/0069952 A1 | 3/2007 | Ling et al. |
| 2007/0069953 A1 | 3/2007 | Ling et al. |
| 2007/0153743 A1 | 7/2007 | Mukkavilli et al. |
| 2007/0182633 A1 | 8/2007 | Omura et al. |
| 2007/0220573 A1 | 9/2007 | Chiussi et al. |
| 2008/0008276 A1 | 1/2008 | Yokoyama |
| 2008/0051147 A1 | 2/2008 | Kwun et al. |
| 2008/0132247 A1 | 6/2008 | Anderson |
| 2009/0028100 A1 | 1/2009 | Mukkavilli et al. |
| 2009/0097396 A1 | 4/2009 | Xing et al. |
| 2009/0252256 A1 | 10/2009 | Yousef |
| 2009/0268665 A1 | 10/2009 | Yousef |
| 2009/0274099 A1 | 11/2009 | Gao et al. |
| 2009/0289851 A1 | 11/2009 | Lommen et al. |
| 2010/0120422 A1 * | 5/2010 | Cheung et al. ............. 455/434 |
| 2010/0150263 A1 | 6/2010 | Peake et al. |

FOREIGN PATENT DOCUMENTS

| | | |
|---|---|---|
| EP | 1 087 585 A2 | 3/2001 |
| EP | 1 785 741 A1 | 5/2007 |
| JP | 2003526995 A | 9/2003 |
| JP | 2007251739 A | 9/2007 |
| KR | 20070051754 A | 5/2007 |
| TW | 488175 | 5/2002 |
| TW | 548935 | 8/2003 |
| TW | 200400737 | 1/2004 |
| WO | WO 97/47148 | 12/1997 |
| WO | WO 00/36767 | 6/2000 |
| WO | 0158195 | 8/2001 |
| WO | WO 03/096547 A1 | 11/2003 |
| WO | WO 2006/039681 A1 | 4/2006 |
| WO | 2006099326 | 9/2006 |
| WO | WO 2006/099526 A2 | 9/2006 |
| WO | 2007038552 | 4/2007 |
| WO | WO 2007/047502 A1 | 4/2007 |
| WO | WO 2007/053954 A1 | 5/2007 |
| WO | WO2007120940 | 10/2007 |

OTHER PUBLICATIONS

Taiwanese Search Report—TW096100332—Taiwan Intellectual Property Office—Aug. 5, 2009.

"Forward Link Only Air Interface Specification for Terrestrial Mobile Multimedia Multicast; TIA-1099" EIA/TIA Standards, Telecommunications Industry Associations, Arlington, VA, US, Aug. 2006, XP017005609.

International Search Report—PCT/US07/060123—International Search Authority—European Patent Office—Oct. 31, 2007.

Georgios Gardikis et al: "Broadband multimedia on the move with DVB-H" Multimedia Tools and Applications, vol, 36, No. 1-2, Feb. 10, 2007, pp. 133-144, XP019555264 Kluwer Academic Publishers, BO, NL ISSN: 1573-7721 * abstract * sections 1, 2.

Murali R Chari et al; "FLO Physical Layer: An Overview" IEEE transactions on Broadcasting, vol. 53, No. 1, Mar. 1, 2007, pp. 145-160, XP011172013, IEEE Service Center, Piscataway, NJ, US, Issn: 0018-9316, Abstract; Figures 8,11,13, Sections IV.C.4), IV.C.8), IV.C.9 Standards.

Nagareda R et al: "OFDM mobile packet transmission system with multiuser detection and metric combining ARQ" IEEE Vehicular Technology Conference, vol. 1, Sep. 26, 2004, pp. 709-713, XP010788469 Piscataway, NJ, USA, IEEE ISBN: 978-0-7803-8521-4 * abstract * sections ILA, ILC, IILA, IILB, IV.A, V.

* cited by examiner

METHODS AND APPARATUS FOR POSITION LOCATION IN A WIRELESS NETWORK

CLAIM OF PRIORITY

This application is a divisional of U.S. patent application Ser. No. 11/517,119, filed on Sep. 6, 2006, now U.S. Pat. No. 7,706,328 which claims the benefit of U.S. Provisional Patent Application No. 60/756,101 entitled "POSITION LOCATION," filed Jan. 4, 2006, and assigned to the assignee hereof and hereby expressly incorporated by reference herein.

BACKGROUND

1. Field

The present application relates generally to the operation of communication systems, and more particularly, to methods and apparatus for positioning in a communication system.

2. Background

Data networks, such as wireless communication networks, have to trade off between services customized for a single terminal and services provided to a large number of terminals. For example, the distribution of multimedia content to a large number of resource limited portable devices (subscribers) is a complicated problem. Therefore, it is very important for network administrators, content retailers, and service providers to have a way to distribute content and/or other network services in a fast and efficient manner and in such a way as to increase bandwidth utilization and power efficiency.

In current content delivery/media distribution systems, real time and non real time services are packed into a transmission superframe and delivered to devices on a network. For example, a communication network may utilize Orthogonal Frequency Division Multiplexing (OFDM) to provide communications between a network server and one or more mobile devices. This technology provides a transmission superframe having data slots that are packed with services to be delivered over a distribution network as a transmit waveform.

It has become increasingly desirable to determine the positions of mobile devices in a wireless network. For example, position location can be used in a variety of applications ranging from network performance to user security. One way to provide device positioning is to utilize a satellite positioning system, such as a Global Positioning System (GPS). While this system can be used to provide device positions it is not very robust, since the satellite signals tend to be very weak and may not be received in tunnels, buildings, or in other environments in which mobile devices operate.

Therefore, it would be desirable to have a system that operates to determine device positions in a wireless network that overcomes the problems associated with conventional positioning systems.

SUMMARY

In one or more aspects, a positioning system is provided that operates to determine device positions in a communication system. In an aspect, transmitter identification information is transmitted on a positioning channel to one or more devices. A receiving device is able to determine a channel estimate associated with the identified transmitter. By monitoring the positioning channel to identify several transmitters and determining their associated channel estimates, a device is able to calculate its position.

In an aspect, a method is provided for determining a position of a device in a network. The method comprises determining whether a symbol to be transmitted is an active symbol, wherein the symbol comprises a plurality of subcarriers, and encoding identification information on a first portion of subcarriers if it is determined that the symbol is the active symbol. The method also comprises encoding idle information on a second portion of subcarriers if it is determined that the symbol in not the active symbol.

In another aspect, an apparatus is provided for determining a position of a device in a network. The apparatus comprises network logic configured to determine whether a symbol to be transmitted is an active symbol, wherein the symbol comprises a plurality of subcarriers. The apparatus also comprises generator logic configured to encode identification information on a first portion of subcarriers if it is determined that the symbol is the active symbol, and to encode idle information on a second portion of subcarriers if it is determined that the symbol in not the active symbol.

In another aspect, an apparatus is provided for determining a position of a device in a network. The apparatus comprises means for determining whether a symbol to be transmitted is an active symbol, wherein the symbol comprises a plurality of subcarriers. The apparatus also comprises means for encoding identification information on a first portion of subcarriers if it is determined that the symbol is the active symbol, and means for encoding idle information on a second portion of subcarriers if it is determined that the symbol in not the active symbol.

In another aspect, a computer-readable medium is provided that has a computer program which when executed by at least one processor operates to determine a position of a device in a network. The computer program comprises instructions for determining whether a symbol to be transmitted is an active symbol, wherein the symbol comprises a plurality of subcarriers. The computer program also comprises instructions for encoding identification information on a first portion of subcarriers if it is determined that the symbol is the active symbol, and instructions for encoding idle information on a second portion of subcarriers if it is determined that the symbol in not the active symbol.

In still another aspect, at least one processor is provided that is configured to perform a method for determining a position of a device in a network. The method comprises determining whether a symbol to be transmitted is an active symbol, wherein the symbol comprises a plurality of subcarriers. The method also comprises encoding identification information on a first portion of subcarriers if it is determined that the symbol is the active symbol, and encoding idle information on a second portion of subcarriers if it is determined that the symbol in not the active symbol.

In an aspect, a method is provided for determining a position of a device in a network. The method comprises decoding a symbol to determine identification information that identifies a transmitter, and determining a channel estimate associated with the transmitter. The method also comprises repeating the operations of decoding and determining for a plurality of symbols so that a plurality of transmitters associated with a plurality of channel estimates, respectively, are determined, and calculating a device position based on the plurality of transmitters and the plurality of channel estimates.

In an aspect, an apparatus is provided for determining a position of a device in a network. The apparatus comprises detector logic configured to decode a plurality of symbols to determine identification information that identifies a plurality of transmitters, and to determine a plurality of channel estimates associated with the plurality of transmitters. The apparatus also comprises position determination logic configured to calculate a device position based on the plurality of transmitters and the plurality of channel estimates.

In an aspect, an apparatus is provided for determining a position of a device in a network. The apparatus comprises detector logic configured to decode a plurality of symbols to determine identification information that identifies a plurality of transmitters, and to determine a plurality of channel estimate associated with the plurality of transmitters. The apparatus also comprises position determination logic configured to calculate a device position based on the plurality of transmitters and the plurality of channel estimates.

In an aspect, a computer-readable medium is provided that has a computer program, which when executed by at least one processor, operates to determine a position of a device in a network. The computer program comprises instructions for decoding a symbol to determine identification information that identifies a transmitter, and instructions for determining a channel estimate associated with the transmitter. The computer program also comprises instructions for repeating the decoding and determining operations for a plurality of symbols so that a plurality of transmitters associated with a plurality of channel estimates, respectively, are determined, and instructions for calculating a device position based on the plurality of transmitters and the plurality of channel estimates.

In an aspect, at least one processor is provided that is configured to perform a method for determining a position of a device in a network. The method comprises decoding a symbol to determine identification information that identifies a transmitter, and determining a channel estimate associated with the transmitter. The method also comprises repeating the operations of decoding and determining for a plurality of symbols so that a plurality of transmitters associated with a plurality of channel estimates, respectively, are determined, and calculating a device position based on the plurality of transmitters and the plurality of channel estimates.

Other aspects will become apparent after review of the hereinafter set forth Brief Description of the Drawings, Description, and the Claims.

BRIEF DESCRIPTION OF THE DRAWINGS

The foregoing aspects described herein will become more readily apparent by reference to the following description when taken in conjunction with the accompanying drawings wherein.

DETAILED DESCRIPTION

In one or more aspects, a positioning system is provided that operates to allow a device to determine its geographic position in a communication network. For example, in an aspect, receiving devices are able to obtain identification information and channel estimates from multiple transmitters. The transmitters' locations are determined from the identifiers and the associated channel estimates allow a receiving device to triangulate its geographic position. Alternatively, a device may offload the actual position calculation to a network server.

For the purpose of this description, aspects of the positioning system are described herein with reference to a communication network that utilizes Orthogonal Frequency Division Multiplexing (OFDM) to provide communications between network transmitters and one or more mobile devices. For example, in an aspect of an OFDM system, a superframe is defined that comprises time division multiplex (TDM) pilot signals, frequency division multiplex (FDM) pilot signals, wide area identifiers (WIC), local area identifiers (LIC), overhead information symbols (OIS), data symbols, and positioning pilot channel (PPC) symbols. The data symbols are used to transport services from the server to receiving devices. A data slot is defined as a set of 500 data symbols that occur over one OFDM symbol time. Additionally, an OFDM symbol time in the superframe carries seven slots of data.

In an aspect, a PPC is used to allow a transmitter to transmit PPC symbols to one or more devices. The PPC symbols provide transmitter identification information that allows for channel estimates for individual transmitters in the network to be determined. The individual channel estimates can then be used for both network optimization (transmitter delays for network optimization and power profiling) and position location (through measurement of delays from all nearby transmitters followed by triangulation techniques).

In an aspect, the superframe boundaries at all transmitters are synchronized to a common clock reference. For example, the common clock reference may be obtained from a Global Positioning System (GPS) time reference. In an aspect, a receiving device uses the PPC symbols to identify a particular transmitter and a channel estimate from a set of transmitters in the vicinity. If channel estimates are available for a number of transmitters (e.g., four transmitters), then standard triangulation techniques are performed to determine the location of the receiving device.

Figure 1:
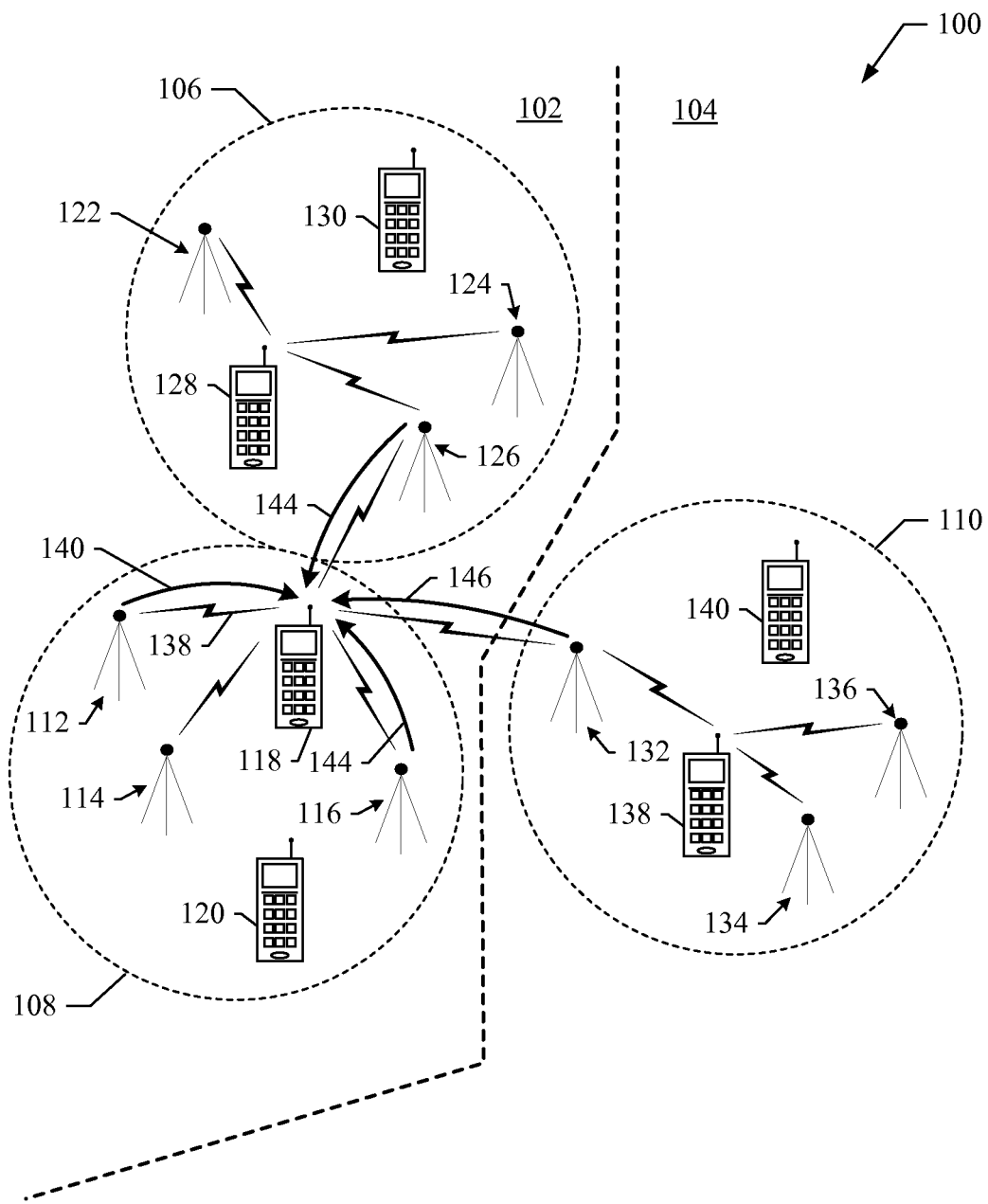
FIG. 1 shows a network that comprises an aspect of a positioning system.

FIG. 1 shows a network 100 that comprises an aspect of a positioning system. The network 100 comprises two wide area regions 102 and 104. Each of the wide area regions 102 and 104 generally covers a large area, such as a state, multiple states, a portion of a country, an entire country, or more than one country. The wide area regions also comprise local area regions (or sub-regions). For example, the wide area region 102 comprises local area regions 106 and 108. The wide area region 104 comprises local area region 110. It should be noted that the network 100 illustrates just one network configuration and that other network configurations having any number of wide area and local area regions are possible within the scope of the aspects.

Each of the local area regions comprises one or more transmitters that provide network coverage to a plurality of mobile devices. For example, the region 108 comprises transmitters 112, 114, and 116, which provide network communications to devices 118 and 120. The region 106 comprises transmitters 122, 124, and 126, which provide network communications to devices 128 and 130. The region 110 comprises transmitters 132, 134, and 136, which provide network communications to devices 138 and 140.

In an aspect, the positioning system comprises a PPC that allows each transmitter to transmit PPC symbols that communicate transmitter identification information to the mobile devices. In an aspect, the transmitter identification information is transmitted as pilot signals scrambled using known region and sub-region identifiers. Thus, the PPC provides a mechanism to allow a receiving device to determine its position based on the transmitters in the vicinity and their associated channel estimates.

As illustrated in FIG. 1, a receiving device may receive PPC symbols from transmitters within its local area, from transmitters in another local area within the same wide area, or from transmitters in a local area outside of its wide area. For example, the device 118 receives PPC symbols from transmitters within its local area 108, as illustrated at 140 and 142. The device 118 also receives PPC symbols from a transmitter in another local area 106, as illustrated at 144. The device 118 also receives PPC symbols from a transmitter in the local area 110, which is in another wide area 104, as illustrated at 146.

In an aspect, the PPC symbols are partitioned into active and idle (or dormant) portions. During operation, network provisioning information is used by each transmitter to determine an "active symbol" during which the transmitter is to become an "active transmitter". An active transmitter is a transmitter that transmits its identifying information on the active portion of the determined PPC symbol. Generally, a transmitter is allocated only one active symbol, however, it is possible to allocate any number of active symbols to a transmitter. Thus, each transmitter is associated with an "active symbol" in which the transmitter transmits identifying information.

When a transmitter is not in the active state, it transmits on the idle portion of the PPC symbols. Typically, receiving devices do not listen for information on the idle portion of the PPC symbols, but allowing transmitters to transmit during the idle portion of the PPC symbols provides power (i.e., energy per symbol) stability to maintain network performance. As a further enhancement, symbols transmitted on the PPC are designed to have a long cyclic prefix so that a device may utilize information from far away transmitters for the purpose of position determination. This mechanism allows a receiving device to receive identification information from a particular transmitter during its associated active symbol without interference from other transmitters in the region because during that active symbol those other transmitters are transmitting on the idle portion of the symbol.

Thus, the positioning system allows a device to determine a transmitter identity and channel estimate for multiple nearby transmitters. By knowing the identity of the transmitters (and thereby their locations) along with their associated channel estimates, triangulation techniques are used to determine the position of the receiving device.

In one or more aspects, a transmitter operates to perform one or more of the following functions for use in a positioning system.
1. Receive network provisioning information that provides transmitter timing (i.e., identifies an active symbol for the transmitter).
2. Determine if a PPC symbol to be transmitted is an active symbol based on the network provisioning information.
3. If the PPC symbol is the active symbol for the transmitter, then encode transmitter identification information on the active portion of the symbol (and use a long cyclic prefix).
4. If the PPC symbol is not the active symbol for the transmitter, then encode idle information on the idle portion of the symbol.
5. Symbol is ready to transmit based on network timing.
6. Repeat above operations for additional PPC symbols if necessary.

In one or more aspects, a device operates to perform one or more of the following functions for use in a positioning system.
1. Receive a symbol on a PPC.
2. Decode the active portion of the symbol to determine the identity of a transmitter.
3. Determine a channel estimate (i.e., transmission delay) for the transmitter and strength of signal received from the transmitter.
4. Repeat the above operations to receive and decode additional PPC symbols to obtain identity and channel estimates for several (i.e., four) transmitters.
5. Calculate a device position based on the location of the transmitters and the channel estimates (i.e., using triangulation techniques).

Thus, in one or more aspects, a positioning system is provided that operates to allow a device in a network to determine its geographic position. It should be noted that the positioning system described in the network 100 is just one implementation and that other implementations are possible within the scope of the aspects.

Figure 2:
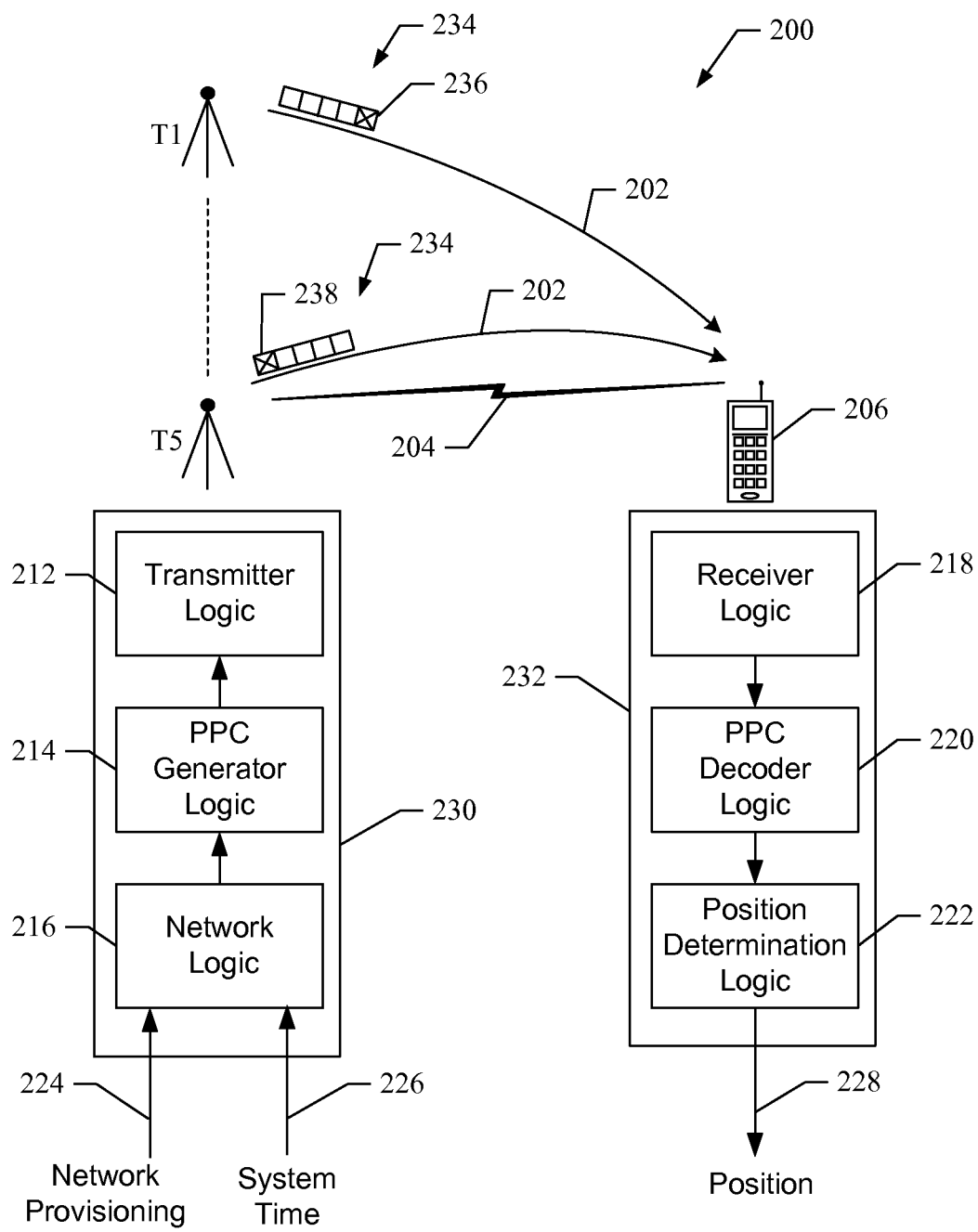
FIG. 2 shows an aspect of a positioning system.

FIG. 2 shows an aspect of a positioning system 200. The positioning system 200 comprises a number of transmitters T1-T5 that transmit information over a PPC 202 to a device 206. For example, the transmitters T1-T5 use wireless communication links, such at the link 204, to transmit a superframe comprising the PPC 202. The transmitters T1-T5 may be transmitters within the same local area as the device 206, transmitters in a different local area, and/or transmitters in a different wide area. Thus, the transmitters T1-T5 represent those transmitters which are nearby to the device 206. It should be noted that the transmitters T1-T5 are part of a communication network that is synchronized to a single time base (e.g., GPS time) so that the superframes (and therefore PPC symbols on the PPC 202) transmitted from the transmitters T1-T5 are aligned and synchronized in time. Note that it is possible to allow for a fixed offset of the start of superframe with respect to the single time base and account for the offset of the respective transmitters in the determination of the propagation delay. Thus, the content of the transmitted superframes may be identical for transmitters within the same local area, but may be different for transmitters in different local or wide areas, however, because the network is synchronized, the superframes are aligned and the device 206 can receive symbols from nearby transmitters over the PPC 204 and those symbols are also aligned.

In an aspect, the wireless communication links 204 are provided using OFDM technology and the transmission of the superframe is carried out over a bandwidth of approximately 6 MHz and at an approximate transmit power on the order of 50 kW. The large bandwidth means better resolution of the propagation delay at the device 206, which in turn translates into better positioning capabilities.

The superframe has a chip rate of approximately 5.55 MHz which corresponds to a basic time resolution of about 180 nanoseconds or a distance resolution of approximately 54 meters in baseband processing. However, aspects of the positioning system can improve the actual resolution by making use of interpolation techniques for first arrival path computation, and also based on the number of transmitters that are nearby to the device 206 at any given time. Furthermore, tall transmit towers and large transmit power ensures better availability of the signal in indoor and urban canyon environments. Thus, aspects of the positioning system operate to provide supplemental position location measurements when other positioning systems are available to the device 206, and operate independently to provide device positions when other systems are not available.

Each of the transmitters T1-T5 comprises transmitter logic 212, PPC generator logic 214, and network logic 216, as illustrated at 230. The receiving device 206 comprises receiver logic 218, PPC decoder logic 220, and position determination logic 222, as illustrated by device logic 232.

The transmitter logic 212 comprises hardware, software or any combination thereof The transmitter logic 212 operates to transmit audio, video and network services using the transmission superframe. The transmitter logic 212 also operates to transmit PPC symbols 234 over the PPC 202. In an aspect, the transmitter logic 212 transmits the PPC symbols 234 over the PPC 202 to provide transmitter identification information for use in aspects of the positioning system.

The PPC generator logic 214 comprises hardware, software or any combination thereof. The PPC generator logic 214 operates to incorporate transmitter identification information into the symbols 234 transmitted over the PPC 202. In an aspect, each PPC symbol comprises subcarriers that are grouped into a selected number of interlaces. An interlace is defined as a set of uniformly spaced subcarriers spanning the available frequency band. In an aspect, each of the transmitters T1-T5 is allocated at least one PPC symbol that is referred to as the active symbol for that transmitter. For example, the transmitter T1 is allocated PPC symbol 236, and the transmitter T5 is allocated PPC symbol 238.

The PPC generator logic 214 operates to encode transmitter identification information into the active symbol for that transmitter. For example, the interlaces of each symbol are grouped into two groups referred to as "active interlaces" and "idle interlaces." The PPC generator logic 214 operates to encode transmitter identification information on the active interlaces of the active symbol for that transmitter. For example, the transmitter T1 identification information is transmitted on the active interlaces of the symbol 236, and the transmitter T5 identification information is transmitted on the active interlaces of the symbol 238. When a transmitter is not transmitting its identification on the active symbol, the PPC generator logic 214 operates to encode idle information on the idle interlaces of the remaining symbols. For example, if the PPC 202 comprises ten symbols, then up to ten transmitters will each be assigned one PPC symbol as their respective active symbol. Each transmitter will encode identification information on the active interlaces of its respective active symbol, and will encode idle information on the idle interlaces of the remaining symbols. It should be noted that when a transmitter is transmitting idle information on the idle interlaces of a PPC symbol, the transmitter logic 212 operates to adjust the power of the transmitted symbol so as to maintain a constant energy per symbol power level.

The network logic 216 comprises hardware, software, or any combination thereof. The network logic 216 operates to receive network provisioning information 224 and system time 226 for use by the positioning system. The provisioning information 224 is used to determine an active symbol for each of the transmitters T1-T5 during which each transmitter is to transmit identification information on their active symbol's active interlaces. The system time 226 is used to synchronize transmissions so that a receiving device is able to determine a channel estimate for a particular transmitter as well as aid in propagation delay measurements.

The receiver logic 218 comprises hardware, software, or any combination thereof. The receiver logic 218 operates to receive the transmission superframe and the PPC symbols 234 on the PPC 202 from nearby transmitters. The receiver logic 218 operates to receive the PPC symbols 234 and passed them to the PPC decoder logic 220.

The PPC decoder logic 220 comprises hardware, software, or any combination thereof. The PPC decoder logic 220 operates to decode the PPC symbols to determine the identity of a particular transmitter associated with each symbol. For example, the decode logic 220 operates to decode the received active interlaces of each PPC symbol to determine the identity of a particular transmitter associated with that symbol. Once a transmitter identity is determined, the PPC decoder logic 220 operates to determine a channel estimate for that transmitter. For example, using a time reference associated with the received superframe, the PPC decoder logic 220 can determine a channel estimate for the active transmitter associated with each received PPC symbol. Thus, the PPC decoder logic 220 operates to determine a number of transmitter identifiers and associated channel estimates. This information is then passed to the position determination logic 222.

The position determination logic 222 comprises hardware, software, or any combination thereof. The position determination logic 222 operates to calculate a position of the device 206 based on the decoded transmitter identifiers and associated channel estimates received from the PPC decoder logic 220. For example, the locations of the transmitters T1-T5 are known to network entities. The channel estimates are used to determine the device's distance from those locations. The position determination logic 222 then uses triangulation techniques to triangulate the position of the device 206.

During operation, each of the transmitters 202 encodes identification information on the active interlaces of an active PPC symbol associated with that transmitter. The PPC generator logic 214 operates to determine which symbol is the active symbol for a particular transmitter based on the network provisioning information 224. When a transmitter is not transmitting its identification information on the active interlaces of its active symbol, the PPC generator logic 214 causes the transmitter to transmit idle information on the idle interlaces of the remaining PPC symbols. Because each transmitter is transmitting energy in each PPC symbol, (i.e., either on the active or idle interlaces) transmitter power does not experience fluctuations that would disrupt network performance.

When the device 206 receives the PPC symbols 234 over the PPC 202 from the transmitters T1-T5, it decodes the transmitter identifiers from the active interlaces of each PPC symbol. Once a transmitter is identified from each PPC symbol, the device is able to determine a channel estimate for that transmitter based on the available system timing. The device continues to determine channel estimates for the transmitters it identifies until channel estimates for a number of transmitters (i.e., preferable four estimates) are obtained. Based on these estimates, the position determination logic 222 operates to triangulate the device's position 228 using standard triangulation techniques. In another aspect, the position determination logic 222 operates to transmit the transmitter identifiers and associated channel estimates to another network entity that performs the triangulation or other positioning algorithm to determine the device's position.

In an aspect, the positioning system comprises a computer program having one or more program instructions ("instructions") stored on a computer-readable medium, which when executed by at least one processor, provides the functions of the positioning system described herein. For example, instructions may be loaded into the PPC generator logic 214 and/or the PPC decoder logic 220 from a computer-readable medium, such as a floppy disk, CDROM, memory card, FLASH memory device, RAM, ROM, or any other type of memory device. In another aspect, the instructions may be downloaded from an external device or network resource. The instructions, when executed by at least one processor operate to provide aspects of a positioning system as described herein.

Thus, the positioning system operates at a transmitter to determine an active PPC symbol in which a particular transmitter is to transmit its identifying information on the active interlaces of that symbol. The positioning system also operates at a receiving device to determine channel estimates for transmitters identified in the received PPC symbols and perform triangulation techniques to determine a device position.

Positioning Pilot Channel Structure

Figure 3:
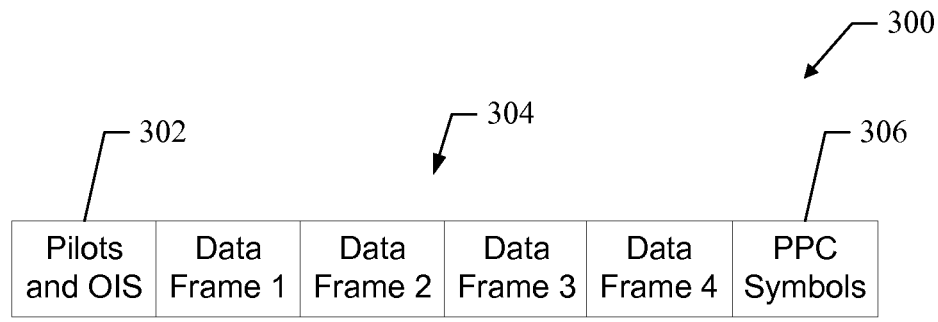
FIG. 3 shows a transmission superframe for use in aspects of a positioning system.

FIG. 3 shows a transmission superframe 300 for use in aspects of a positioning system. The transmission superframe 300 comprises pilots and overhead information symbols 302, data frames 304 and PPC symbols 306. In an aspect of transmission superframe, the PPC symbols 306 are generated from fourteen reserve symbols located at the end of the superframe 300. In this case, each of the reserve symbols comprises 4096 subcarriers with a 512 chip cyclic prefix and a 17 chip window length for a total of 4625 chips per symbol. As a result, the fourteen reserve symbols represent 64750 chips.

In an aspect, the PPC symbols 306 have a cyclic prefix that is increased to 2362 chips. The increased cyclic prefix allows a device to receive signals from far-away transmitters for the purpose of position determination. This means that each PPC symbol is 6475 chips (2362+4096+17). Given an overall availability of 64750 chips it follows that ten PPC symbols 306 are possible using the available chips in the reserve symbols. It should be noted that other PPC symbol configurations are possible within the scope of the aspects.

Figure 4:
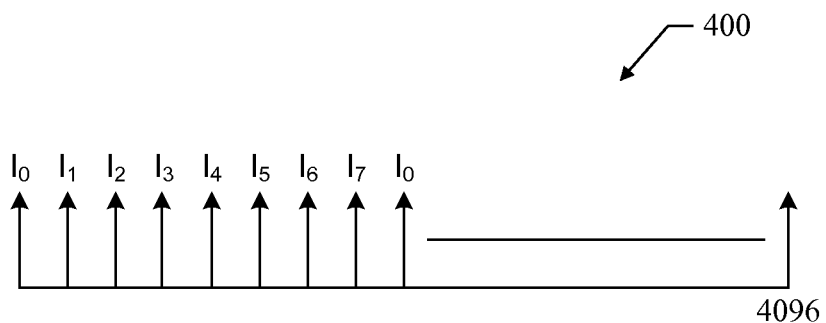
FIG. 4 shows a diagram of an interlace structure for use in a positioning system.

FIG. 4 shows a diagram of an interlace structure 400 for use in aspects of a positioning system. For example, the interlace structure 400 is suitable for use with each of the PPC symbols 306 shown in FIG. 3. The interlace structure 400 comprises 4096 subcarriers that are grouped into eight interlaces ($I_0$-$I_7$) as shown, so that each interlace comprises 512 subcarriers. The interlaces ($I_0$-$I_7$) are used to carry transmitter identification information and idle information in aspects of the positioning system.

Figure 5:
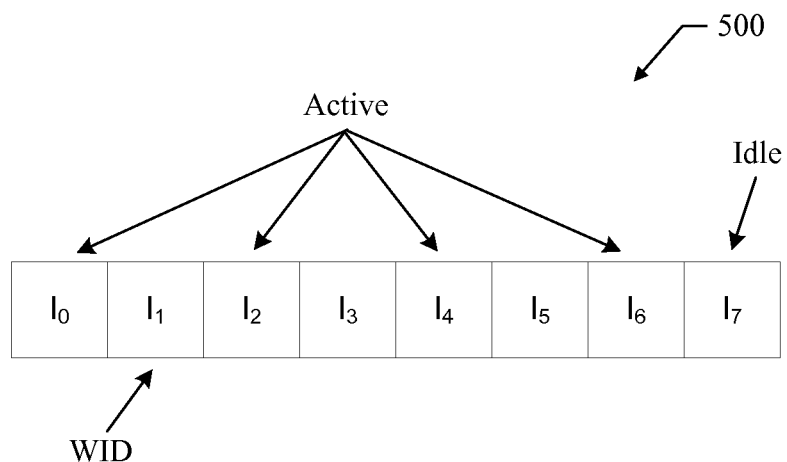
FIG. 5 shows a functional diagram of the interlace structure shown in FIG. 4.

FIG. 5 shows a functional diagram 500 of the interlace structure defined in FIG. 4. The diagram 500 shows the eight interlaces ($I_0$-$I_7$) that are generated from the 4096 data subcarriers of each PPC symbol. In an aspect, four interlaces (i.e., $I_0$, $I_2$, $I_4$, $I_6$) are defined as active interlaces. The active interlaces are used by transmitters to transmit identification information. An idle interlace ($I_7$) is defined that is used by those transmitters not transmitting on the active interlaces to transmit idle information. Thus, transmitters in the positioning system are not required to turn on and off, but continue to transmit power either on the active interlaces or on the idle interlace. Furthermore, the interlace $I_1$ is used by the active transmitter to transmit a scrambled region identifier (i.e., a wide area scrambler seed (WID)).

Transmitter Identification

In an aspect of a positioning system, there are two things that a receiver needs to identify from the received PPC symbols. First, a receiving device needs to determine a channel estimate using the pilot subcarriers in the symbol. Second, a receiving device needs to determine the identity of the transmitter to which the channel estimate corresponds.

In an aspect, a transmitter in the active transmission state transmits only pilot symbols (i.e., the transmitter identity is not explicitly encoded in the PPC symbols). However, due to the scheduling of the transmitters in a given neighborhood, it is possible to use the location of the active PPC symbol in the transmission superframe (along with a superframe index) to associate transmitters with the PPC symbols, and eventually the channel estimates derived from the PPC symbols. If the PPC transmissions are strictly time division multiple access (TDMA) across all the transmitters in the network, then the PPC symbol index in the superframe along with the superframe index maps uniquely to a particular transmitter in the network. However, the assignment of the active PPC slots to transmitters is such that there is no interference between two transmitters that are allowed to transmit in the same slot. Hence, two different transmitters that are physically far apart from each other can be allowed to transmit in the same PPC symbol to maximize the number of transmitters that can be supported per transmission superframe.

In an aspect, a constraint is provided in allocating active PPC symbols to the transmitters so that any two transmitters in the same local area are not in the active state at the same time. This means that it suffices to know a wide area (WOI) identifier and a local area (LOI) identifier to uniquely map each transmitter to a PPC symbol. However, the above constraint is not enough to avoid interference between two transmitters which are at the boundary of their respective local areas. Thus, further network planning is required to ensure interference free operation among all the transmitters.

In an aspect, the WOI identifier and the LOI identifier are available at the higher layers and are in fact available when the OIS symbols are decoded. At the physical layer, the transmissions across various regions and sub-regions (i.e., wide and local areas) are distinguished via the use of different scrambler seeds. In an aspect, a 4-bit field in the scrambler seed called the WID helps separate the wide area transmissions and another 4-bit field called the LID helps separate the local area transmissions. Since, there are only 16 possible WID values and 16 possible LID values, the WID and LID values may not be unique across the entire network deployment. For example, a given combination of WID and LID could potentially map to multiple WOI and LOI identifiers. However, network planning can again be provided so that the re-use of WID and LID will be geographically separated. Hence, in a given neighborhood, it is possible to map a given WID and a LID to a particular WOI and LOI without any ambiguity. Therefore, at the physical layer, the PPC waveform is designed to carry the WID and the LID information.

As described above, a transmitter in the active state should preferably transmit at least 2048 pilots in order to enable the receiver to estimate the channels with required delay spreads. This corresponds to four interlaces for the active transmitter. The four active interlaces are then scrambled using the WID and the LID pertaining to the wide and local area to which the transmitter belongs. A receiver first extracts the WID and the LID information from the pilots in the active interlaces of a PPC symbol and then uses the WID/LID information to obtain the channel estimate from that particular transmitter. Scrambling with WID and LID also provides interference suppression from transmitters in neighboring local area networks. Recall that the transmitters within the same local area are constrained to use different PPC symbols when in the active state.

In an aspect, the active transmitter scrambles four active interlaces with both WID and LID seeds to ensure maximum interference suppression across networks. However, the corresponding WID/LID identification step at the receiver may become complicated. For example, if each interlace is scrambled using both WID and LID, the receiver will have to jointly detect the WID and the LID seeds used for scrambling. There are 16 possibilities for each so that the receiver will have to try out 256 hypotheses for joint detection.

In an aspect, the receiver detection is simplified by allowing separate detection of the WID and LID seeds. Therefore, in an aspect, the PPC waveform comprises five non-zero interlaces. Referring again to FIG. 5, interlaces 0, 2, 4 and 6 comprise pilots scrambled with both WID and LID values. The interlace 1 comprises pilots scrambled with only WID values while the LID value is set to 0000. All the remaining interlaces will not carry any energy. Hence, the energy in each interlace is given by ⅝ of the energy available per symbol. The PPC symbol of a passive transmitter will have non-zero energy in interlace 7 only. The energy of this interlace will be scaled to eight times the energy available per OFDM symbol to meet the constant OFDM symbol energy constraint.

Figure 6:
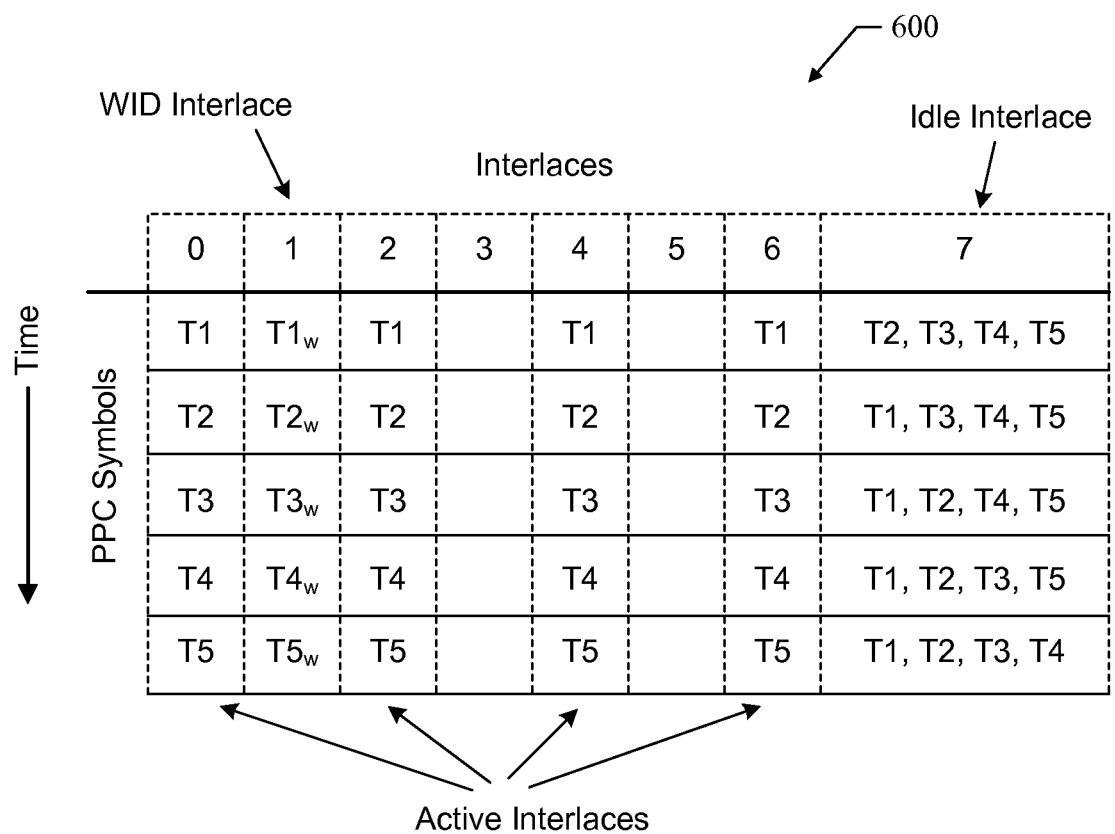
FIG. 6 shows a table that illustrates how PPC symbols are transmitted by transmitters in an aspect of a positioning system.

FIG. 6 shows a table 600 that illustrates how PPC symbols are transmitted by transmitters in an aspect of a positioning system. For example, the table 600 shows how the five transmitters (T1-T5) shown in FIG. 2 transmit identification information in five PPC symbols. Each of the transmitters transmits its identification information on active interlaces ($I_0$, $I_2$, $I_4$, $I_6$) of a PPC symbol assigned to that transmitter. When one transmitter transmits on the active interlaces of a particular symbol, the other transmitters transmit on an idle interlace ($I_7$). Furthermore, the active transmitter also transmits pilots scrambled with WID information on interlace ($I_1$). Thus, while transmitter T1 is active and transmits on the active interlaces ($I_0$, $I_2$, $I_4$, $I_6$) and $I_1$, the remaining transmitters (T2-T5) transmit on the idle interlace ($I_7$).

System Scalability

Based on the above, an aspect of a positioning system can support ten transmitters using the ten PPC symbols available per superframe in a local area. However, the number of transmitters in a local area could be higher than ten in certain deployments. Further, only the transmitters in a particular local area are constrained to be orthogonal in time. Therefore, network planning may be used to schedule transmitters across different local areas such that self interference in the network is avoided, or at least mitigated.

In an aspect, the positioning system operates to support more than ten transmitters per local area. It will be assume that thirty transmitters are to be supported in a local area. To support this deployment, each transmitter enters the active mode of transmission once in every three superframes. For example, network planning and overhead parameters are used to notify transmitters when their respective active state is to occur and when they are to transmit identification information on an assigned active symbol. Thus, the periodicity of three superframes is programmable at the network level so that the system is scalable enough to support additional transmitters. The periodicity employed by the network can be kept constant throughout the network deployment so that both the network planning as well as the overhead information used to convey the information can be simplified. In an aspect, the information about the periodicity being employed in the network is broadcast as overhead information in the higher layers to allow for easier programmability of this parameter. Additionally, with thirty PPC symbols available for each local area, the constraints on network planning to alleviate interference at the boundary of two different local areas are also eased.

Figure 7:
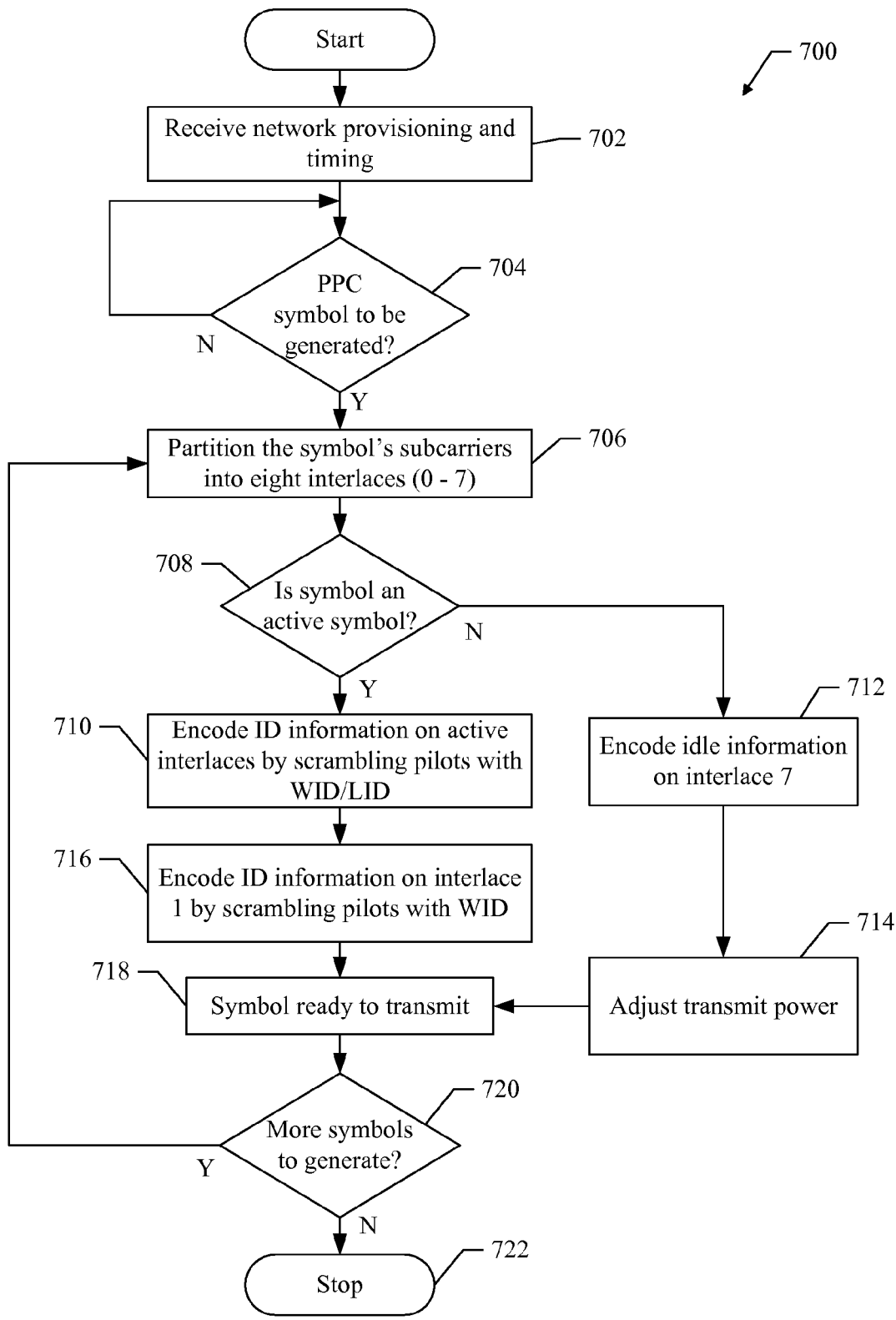
FIG. 7 shows an aspect of a method for providing a positioning system.

FIG. 7 shows an aspect of a method 700 for providing a positioning system. For example, the method 700 is suitable for use by a transmitter in a network to allow a receiving device to make a position determination. In an aspect, method 700 is provided by a transmitter configured as illustrated at 230 shown in FIG. 2.

At block 702, network provisioning is received. The network provisioning identifies when a transmitter is to go into an active state and transmit identification information on a PPC symbol. For example, an active transmitter transmits on the active interlaces of a selected PPC symbol. In an aspect, the network provisioning information 224 is received at the network logic 216 from any suitable network administration entity.

At block 704, a test is performed to determine if a PPC symbol needs to be generated. For example, the PPC generator logic 214 operates to determine if a PPC symbol needs to be generated for transmission on a PPC, such at the PPC 202. If a symbol needs to be generated the method proceeds to block 706. If a symbol does not need to be generated, the method waits at block 704.

At block 706, the subcarriers of a PPC symbol are partitioned into eight interlaces ($I_0$-$I_7$). For example, the subcarriers are partitioned into interlaces as shown in FIG. 4. In an aspect, the PPC generator logic 214 operates to partition the subcarriers so that interlaces ($I_0$, $I_2$, $I_4$, $I_6$) form active interlaces and $I_7$ forms an idle interlace.

At block 708, a test is performed to determine if the symbol to be generated is an active symbol. For example, in aspects of a positioning system, each transmitter enters an active state and transmits identification information on the active interlaces of a selected active symbol. In an aspect, the PPC generator logic 214 operates to determine if the symbol to be generated is an active symbol. If the symbol is an active symbol, the method proceeds to block 710, and if the symbol is not an active symbol the method proceeds to block 712.

At block 710, transmitter identification information is encoded on the active interlaces of the symbol. For example, pilot signals are scrambled with WID and LID to encode the active interlaces ($I_0$, $I_2$, $I_4$, $I_6$) with transmitter identification information. The WID and LID values are used to scramble a particular network region and sub-region where the transmitter is located. In an aspect, the PPC generator logic 214 operates to scramble the pilots of the active interlaces with the WID and LID values.

At block 716, a region identifier is encoded on interlace 1. For example, pilot signals are scrambled with the WID to encode the region identifier on the interlace ($I_1$). In an aspect, the PPC generator logic 214 operates to scramble the pilots with the WID value.

At block 718, a PPC symbol is ready to transmit. For example, the PPC symbol is ready to be transmitted over the PPC 202 by the transmitter logic 212.

At block 712, idle information is encoded on interlace 7. For example, it is determined that the symbol to be generated is not an active symbol for this transmitter and so idle information is encoded on the pilots of interlace 7. The idle information comprises any suitable information. In an aspect, the PPC generator logic 214 operates to encode the idle information on the interlace 7.

At block 714, an adjustment is made to adjust the transmit power of the symbol. For example, because the symbol is not an active symbol, the symbol comprises energy only on the idle interlace (interlace 7). Thus, the power of the symbol is adjusted to maintain a constant energy per symbol.

At block 720, a test is performed to determine if there are more PPC symbols to generate. For example, the PPC generator logic 214 operates to determine if there are more symbols to generate for this transmitter. In an aspect, if the PPC conveys ten PPC symbols, then a transmitter will generate ten symbols with one of the symbols being an active symbol. However, it should be noted that it is possible to extend the periodicity of active symbols to accommodate various network configurations. In such a case, the ratio of active to idle symbols generated at each transmitter may vary. If there are more symbols to generate, the method proceeds to block 706. If there are not more symbols to generate, the method stops at block 722.

Thus, the method 700 operates to provide an aspect of a positioning system. It should be noted that the method 700 represents just one implementation and the changes, additions, deletions, combinations or other modifications of the method 700 are possible within the scope of the aspects.

Figure 8:
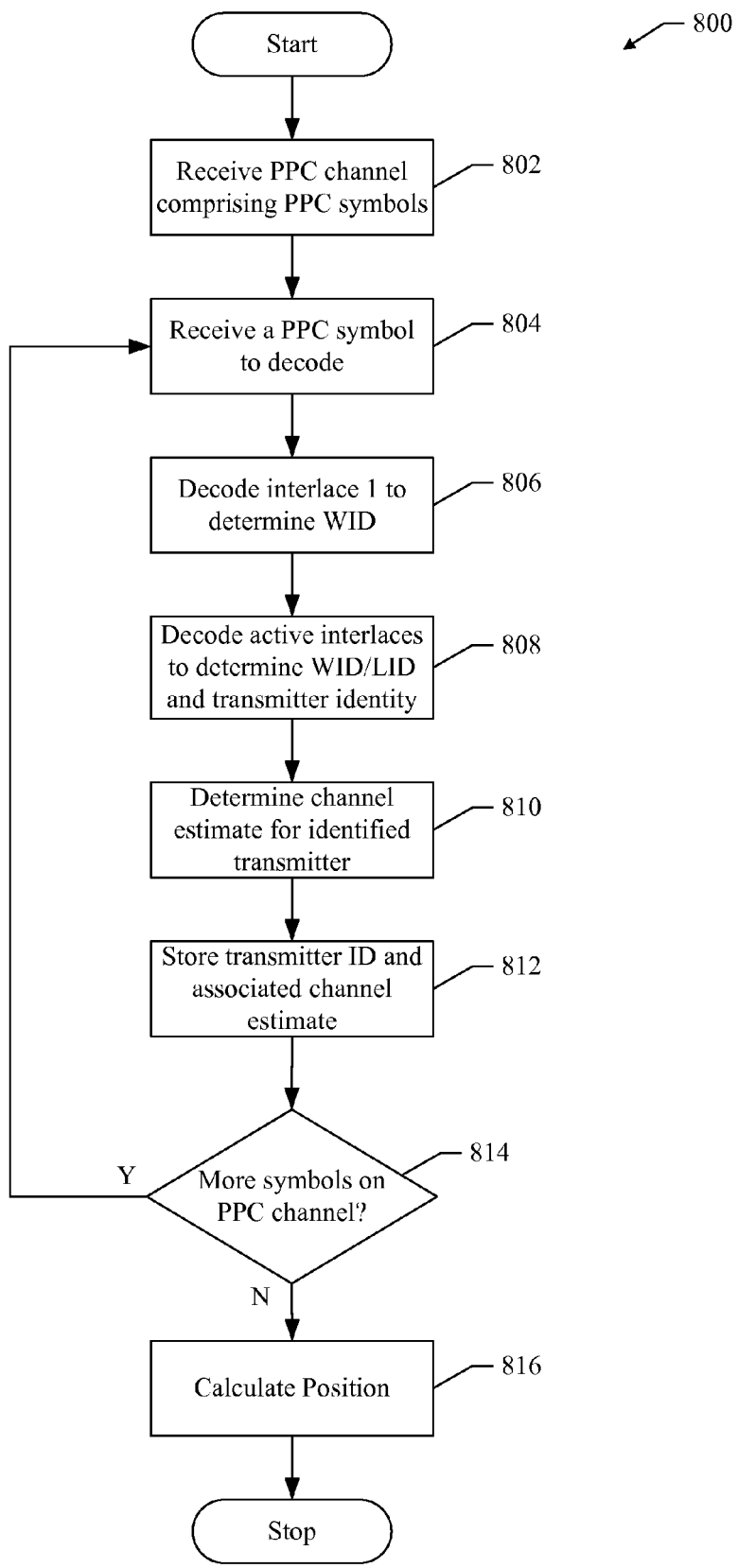
FIG. 8 shows an aspect of a method for providing a positioning system.

FIG. 8 shows an aspect of a method 800 for providing a positioning system. For example, the method 800 is suitable for use by a receiving device in a network to make a position determination. In an aspect, method 800 is provided by a receiver configured as illustrated at 232 as shown in FIG. 2.

At block 802, a transmission superframe comprising a PPC is received. For example, the transmission superframe is received over an OFDM network. In an aspect, the receiving logic 218 operates to receive the transmission superframe and the PPC.

At block 804, a PPC symbol is received over the PPC. For example, the received PPC comprises ten PPC symbols and one of the ten symbols is received for processing. In an aspect, the receiver logic 218 operates to receive the PPC symbol to decode.

At block 806, interlace 1 of the received PPC symbol is descrambled to determine a WID associated with the active transmitter that encoded interlace 1. For example, in an aspect, the PPC comprises ten PPC symbols that are each made up of eight interlaces. Interlace 1 of each symbol comprises pilot signals scrambled with a WID value that corresponds to the wide area region of the active transmitter associated with a particular symbol. In an aspect, the PPC decoder logic 220 operates to descramble interlace 1 to determine the WID value associated with the active transmitter.

At block 808, the active interlaces of the received PPC symbol are descrambled to determine WID and LID values. For example, the active interlaces comprises ($I_0$, $I_2$, $I_4$, and $I_6$). In an aspect, the PPC decoder logic 220 operates to descramble the active interlaces to determine the WID and LID values associated with the active transmitter.

At block 810, a channel estimate is generated for the active transmitter associated with the received PPC symbol. In an aspect, system timing available throughout the network is used to determine a channel estimate (or delay time) of the superframe from the active transmitter to the receiving device. In an aspect, the receiver logic 218 operates to determine the channel estimate.

At block 812, the transmitter identity and the associated channel estimate are stored. For example, the PPC decoder logic 220 comprises a memory that is used to store decoded transmitter identifiers and associated channel estimates.

At block 814, a test is performed to determine if there are more symbols to receive on the PPC. For example, in an aspect, the PPC conveys ten symbols that are associated with ten different transmitters. The PPC decoder logic 220 determines if there are more symbols to receive on the PPC, and if so, the method proceeds to block 804. If there are no more symbols to receive the method proceeds to block 816.

In an aspect, channel estimates for at least four transmitters are used to calculate a position for the device. The position determination logic 222 operates to determine if enough channel estimates have been determined. If enough channel estimates have been determined to compute a device position, the method proceeds to block 816 to calculate the device position.

At block 816, a position calculation for the receiving device is made. For example, the channel estimates associated with the transmitters identified by the descrambled WID and LID are used to determine the position of the receiving device. In an aspect, the location of transmitters in each region are known and provided to devices in one of many ways. For example, the locations are provided in overhead communications to the devices. Also provided in overhead communications are symbol indexes that identify a PPC symbol in which a particular transmitter will be transmitting.

Once the WID and LID are used to determine a particular region, network provisioning is used to determine the particular transmitter. The channel estimate associated with this transmitter provides the distance between the transmitter and the receiving device. Several transmitter locations and channels estimates are used to triangulate the position of the receiving device. In an aspect, the triangulation process is performed by the position determination logic 222. In another aspect, the device transmits channel estimates and associated transmitter identifiers to a network server that performs the triangulation process. For example, the device may transmit the WID, LID, channel estimates, and time references to a network server that computes the device position.

Thus, the method 800 operates to provide an aspect of a positioning system. It should be noted that the method 800 represents just one implementation and the changes, additions, deletions, combinations or other modifications of the method 800 are possible within the scope of the aspects.

Figure 9:
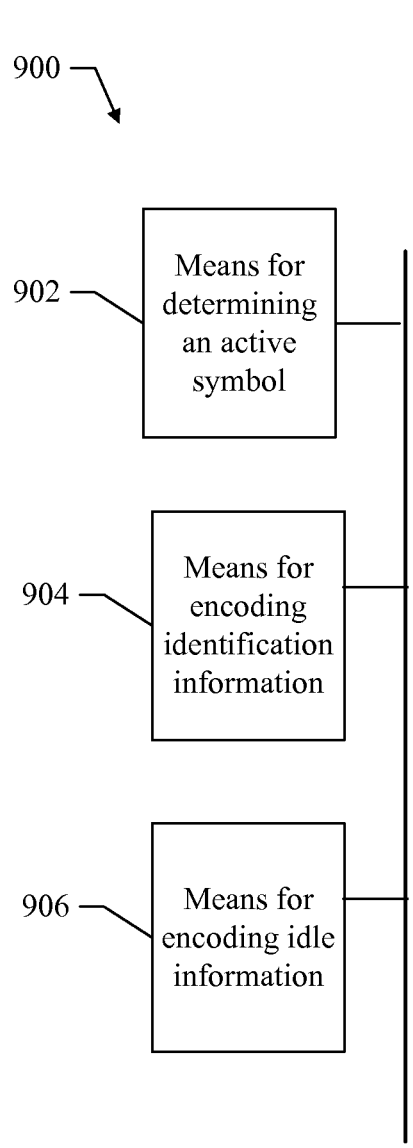
FIG. 9 shows an aspect of a positioning system.

FIG. 9 shows an aspect of a positioning system 900. The positioning system 900 comprises means (902) for determining an active symbol, means (904) for encoding identification information, and means (906) for encoding idle information. In an aspect, the means 902, 904, and 906 are implemented by at least one processor configured to execute program instructions to provide aspects of a positioning system as described herein. In an aspect, the means 902, 904, and 906 are implemented by the PPC generator logic 214.

Figure 10:
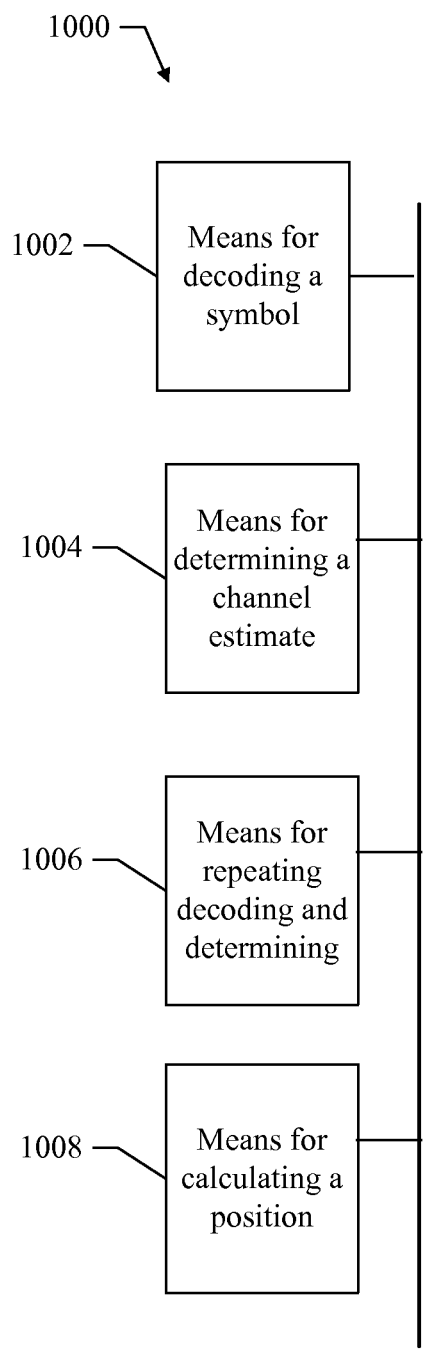
FIG. 10 shows an aspect of a positioning system.

FIG. 10 shows an aspect of a positioning system 1000. The positioning system 1000 comprises means (1002) for decoding a symbol, means (1004) for determining a channel estimate, means (1006) for repeating the decoding and determining, and means (1008) for calculating a device position. In an aspect, the means 1002, 1004, 1006, and 1008 are implemented by at least one processor configured to execute program instructions to provide aspects of a positioning system as described herein. In an aspect, the means 1002, 1004, and 1006 are implemented by the PPC detector logic 220. In an aspect, the means 1008 is implemented by the position determination logic 222.

Therefore various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed aspects is provided to enable any person skilled in the art to make or use the present invention. Various modifications to these aspects may be readily apparent to those skilled in the art, and the generic principles defined herein may be applied to other aspects, e.g., in an instant messaging service or any general wireless data communication applications, without departing from the spirit or scope of the invention. Thus, the present invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

Accordingly, while aspects of a positioning system have been illustrated and described herein, it will be appreciated that various changes can be made to the aspects without departing from their spirit or essential characteristics. Therefore, the disclosures and descriptions herein are intended to be illustrative, but not limiting, of the scope of the invention, which is set forth in the following claims.

What is claimed is:

1. A method for determining a position of a device in a network, the method comprising:
    decoding a symbol comprising subcarriers to determine identification information that identifies a transmitter, wherein the decoding comprises partitioning the subcarriers of the symbol;
    determining a channel estimate associated with the transmitter;
    repeating said decoding and said determining for a plurality of symbols so that a plurality of transmitters associated with a plurality of channel estimates, respectively, are determined; and
    calculating a device position based on the plurality of transmitters and the plurality of channel estimates.

2. The method of claim 1, wherein said decoding comprises receiving the symbol over a pilot positioning channel.

3. The method of claim 1, wherein said decoding comprises partitioning the subcarriers of the symbol into a plurality of interlaces.

4. The method of claim 3, wherein said decoding comprises decoding a selected interlace to determine a wide area scrambler seed (WID) value.

5. The method of claim 3, wherein said decoding comprises decoding the plurality of interlaces to determine a wide area scrambler seed (WID) value and a local area scrambler seed (LID) value.

6. The method of claim 1, wherein said determining comprises determining the channel estimate by determining a transmission time associated with the transmitter.

7. The method of claim 1, wherein said calculating comprises calculating the device position based on the plurality of transmitters and the plurality of channel estimates using triangulation.

8. An apparatus for determining a position of a device in a network, the apparatus comprising:
    detector logic implemented by a hardware component and configured to decode a plurality of symbols to determine identification information that identifies a plurality of transmitters, and to determine a plurality of channel estimate associated with the plurality of transmitters, wherein each of the plurality of symbols is associated with a plurality of partitioned subcarriers; and
    position determination logic configured to calculate a device position based on the plurality of transmitters and the plurality of channel estimates.

9. The apparatus of claim 8, further comprising a receiver configured to receive the plurality of symbols over a pilot positioning channel.

10. The apparatus of claim 8, wherein the plurality of partitioned subcarriers comprise subcarriers partitioned into interlaces.

11. The apparatus of claim 10, wherein said detector logic is configured to decode a selected interlace to determine a wide area scrambler seed (WID) value.

12. The apparatus of claim 10, wherein said detector logic is configured to decode the plurality of interlaces to determine a wide area scrambler seed (WID) value and a local area scrambler seed (LID) value.

13. The apparatus of claim 8, wherein said detector logic is configured to determine the plurality of channel estimates by determining a plurality of propagation delays associated with the plurality of transmitters.

14. The apparatus of claim 8, wherein said position determination logic is configured to calculate the device position based on the plurality of transmitters and the plurality of channel estimates using triangulation.

15. An apparatus for determining a position of a device in a network, the apparatus comprising:
    means for decoding a symbol to determine identification information that identifies a transmitter, wherein said means for decoding comprises means for partitioning subcarriers of the symbol into a plurality interlaces;
    means for determining a channel estimate associated with the transmitter;
    means for repeating said decoding and said determining for a plurality of symbols so that a plurality of transmitters associated with a plurality of channel estimates, respectively, are determined; and
    means for calculating a device position based on the plurality of transmitters and the plurality of channel estimates.

16. The apparatus of claim 15, wherein said means for decoding comprises means for receiving the symbol over a pilot positioning channel.

17. The apparatus of claim 15, wherein said means for decoding comprises means for decoding a selected interlace to determine a wide area scrambler seed (WID) value.

18. The apparatus of claim 15, wherein said means for decoding comprises means for decoding the plurality of interlaces to determine a wide area scrambler seed (WID) value and a local area scrambler seed (LID) value.

19. The apparatus of claim 15, wherein said means for determining comprises means for determining the channel estimate by determining a transmission time delay associated with the transmitter.

20. The apparatus of claim 15, wherein said means for calculating comprises means for calculating the device position based on the plurality of transmitters and the plurality of channel estimates using triangulation.

21. A non-transitory computer-readable medium having a computer program, which when executed by at least one processor, operates to determine a position of a device in a network, the computer program comprising:

instructions for decoding a plurality of interlaces of a symbol to determine identification information that identifies a transmitter, wherein each of the plurality of interlaces comprises a plurality of subcarriers associated with the symbol;

instructions for determining a channel estimate associated with the transmitter;

instructions for repeating said decoding and said determining for a plurality of symbols so that a plurality of transmitters associated with a plurality of channel estimates, respectively, are determined; and instructions for calculating a device position based on the plurality of transmitters and the plurality of channel estimates.

22. The computer program of claim 21, wherein said instructions for decoding comprise instructions for receiving the symbol over a pilot positioning channel.

23. The computer program of claim 21, wherein said instructions for decoding comprise instructions for partitioning the plurality of subcarriers into the plurality interlaces.

24. The computer program of claim 23, wherein said instructions for decoding comprise instructions for decoding a selected interlace to determine a wide area scrambler seed (WID) value.

25. The computer program of claim 23, wherein said instructions for decoding comprise instructions for decoding the plurality of interlaces to determine a wide area scrambler seed (WID) value and a local area scrambler seed (LID) value.

26. The computer program of claim 21, wherein said instructions for determining comprise instructions for determining the channel estimate by determining a propagation delay associated with the transmitter.

27. The computer program of claim 21, wherein said instructions for calculating comprise instructions for calculating the device position based on the plurality of transmitters and the plurality of channel estimates using triangulation.

28. At least one processor configured to perform a method for determining a position of a device in a network, the method comprising:

decoding a symbol comprising partitioned subcarriers to determine identification information that identifies a transmitter;

determining a channel estimate associated with the transmitter using the subcarriers of the symbol;

repeating said decoding and said determining for a plurality of symbols so that a plurality of transmitters associated with a plurality of channel estimates, respectively, are determined; and calculating a device position based on the plurality of transmitters and the plurality of channel estimates.

29. The at least one processor of claim 28, wherein said decoding comprises receiving the symbol over a pilot positioning channel.

30. The at least one processor of claim 28, wherein said decoding comprises partitioning the subcarriers of the symbol into a plurality interlaces.

31. The at least one processor of claim 30, wherein said decoding comprises decoding a selected interlace to determine a wide area scrambler seed (WID) value.

32. The at least one processor of claim 30, wherein said decoding comprises decoding the plurality of interlaces to determine a wide area scrambler seed (WID) value and a local area scrambler seed (LID) value.

33. The at least one processor of claim 28, wherein said determining comprises determining the channel estimate by determining a transmission time associated with the transmitter.

34. The at least one processor of claim 28, wherein said calculating comprises calculating the device position based on the plurality of transmitters and the plurality of channel estimates using triangulation.

* * * * *